Figure 1:
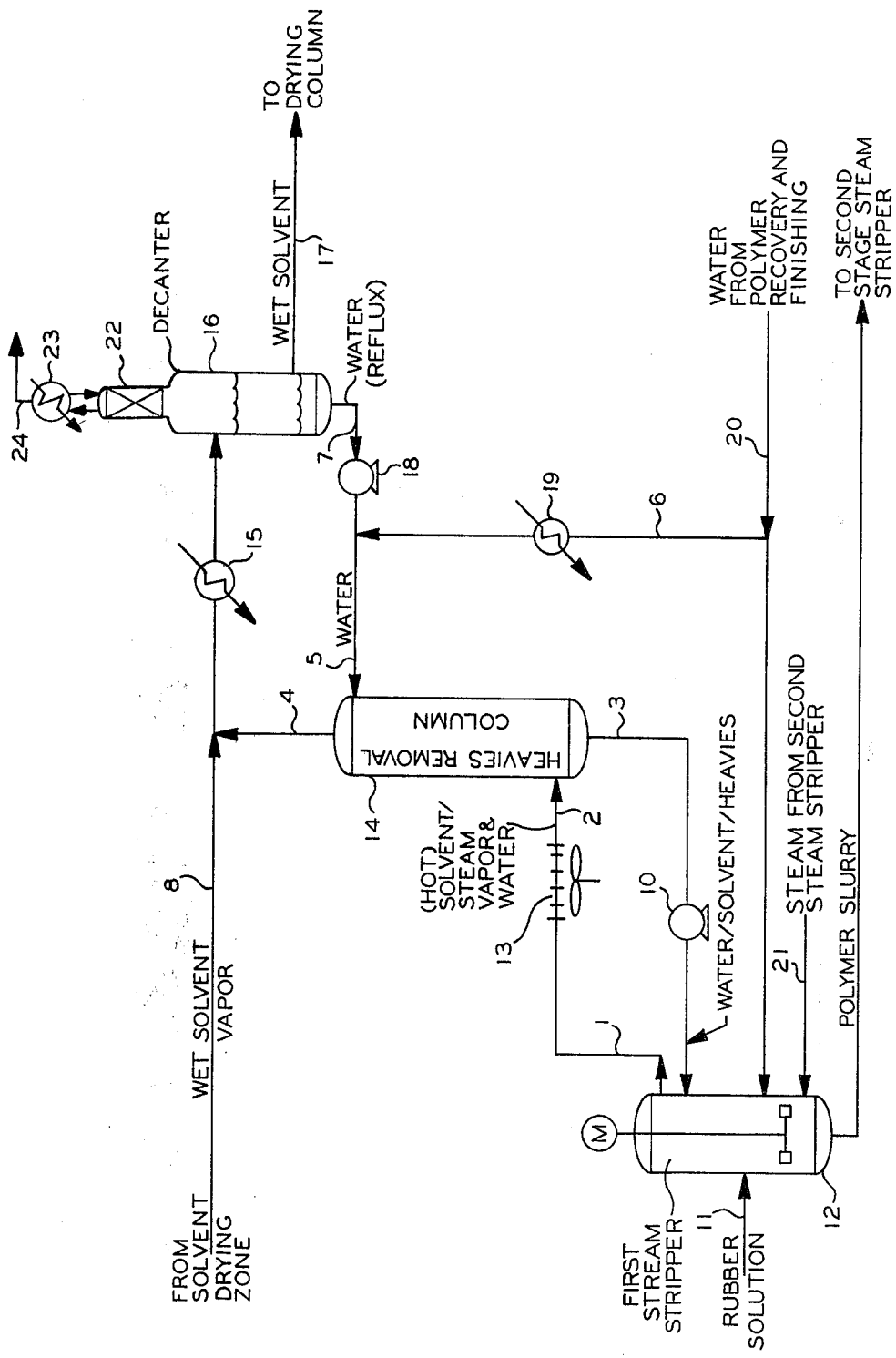

United States Patent [19]

Irvin

[11] 4,418,191
[45] Nov. 29, 1983

[54] SOLVENT PURIFICATION
[75] Inventor: Howard B. Irvin, Bartlesville, Okla.
[73] Assignee: Phillips Petroleum Company, Bartlesville, Okla.
[21] Appl. No.: 306,801
[22] Filed: Sep. 29, 1981
[51] Int. Cl.³ .............................................. C08F 6/16
[52] U.S. Cl. .................................................... 528/500
[58] Field of Search ................... 528/500; 526/70, 71, 526/88

[56] References Cited

U.S. PATENT DOCUMENTS

| | | | |
|---|---|---|---|
| 2,964,512 | 12/1960 | Goins | 260/94.9 |
| 3,257,372 | 6/1966 | Moon | 260/93.7 |
| 3,296,241 | 1/1967 | Berger | 260/94.2 |
| 3,326,781 | 6/1967 | Wilson, Jr. | 203/83 |
| 3,403,080 | 9/1968 | Clay | 203/98 |
| 3,462,347 | 8/1969 | Chapman et al. | 203/6 |
| 3,640,980 | 2/1972 | Baba | 260/82.1 |
| 3,684,783 | 8/1972 | Lauck | 528/500 |
| 3,816,379 | 6/1974 | Rosenbaum et al. | 260/80.78 |
| 4,098,992 | 7/1978 | Belles | 528/500 |

*Primary Examiner*—Paul R. Michl

[57] ABSTRACT

A solution polymer process is made essentially energy-free by employing solvent vapor from steam stripping as the sole heat source during the separation of heavies from recycle solvent.

5 Claims, 1 Drawing Figure

SOLVENT PURIFICATION

BACKGROUND

In the treatment of solvents for recycling in solution rubber processes considerable energy is needed to remove impurities, such as water, lights and heavies. A need has arisen for a process in which the energy produced as a by-product in one solvent separation step is used in subsequent steps. Currently, in conventional polymer processing, recycle solvent is purified by fractionation to remove water, low boiling impurities (lights) and high boiling impurities (heavies). Typically a single column fractionator is used with feed into the top, water and lights going out the top, purified solvent vapor off a side-draw, and dilute solution of heavies out the bottom.

THE INVENTION

In this invention, solvent/steam vapor from the polymer stripping zone is partially condensed and fed to the bottom of the fractionator, where it serves as the sole source of heat for the fractionation. The overhead from the fractionator is combined with wet solvent vapor from a drying zone and passes via a condenser to a decanter, from which the water serves as fractionator reflux and the solvent passes to a drying column. Fractionator bottoms are returned to the steam stripping zone.

OBJECTS OF THE INVENTION

It is an object of the invention to minimize the energy requirements of solution polymer processing.

It is another object to provide a method by which part or all of the energy requirements of solvent purification result from a previous solvent separation.

It is yet another object to provide a process in which the solvent vapor from polymer solution stripping is used as a source of heat for one or more solvent purification steps, such as heavies removal.

ADVANTAGES

The process is advantageous because its use results in considerable energy savings. Less external heat, or steam, has to be supplied to the system. Practicing the invention, a substantially energy-free removal of heavies from solvent is carried out. Typically, steam savings on the order of 3600 lb/hr or $115,000/yr for a 6,000 lb/hr rubber line are attained.

DESCRIPTION OF THE INVENTION

In general terms, a preferred embodiment involves a solution rubber process in which hydrocarbon solvent is removed from reactor effluent by flashing and steam stripping, stripper overhead is partially condensed and fed into the bottom of a heavies removal column, the feed serving as the sole source of heat for the fractionation. Column overhead, together with wet solvent vapor from a solvent drying zone, is condensed and collected in a decanter from which the wet solvent phase passes to the drying column and the water phase, together with some recycle water from downstream polymer dewatering, serves as fractionator reflux. Column bottoms containing water, some solvent and all the heavies are returned to steam stripping.

In a typical inventive scheme, a polymer solution derived from flash concentration or polymerization is fed to a steam stripper line to simultaneously remove the solvent and precipitate the rubber as a slurry in water. Two or more strippers are operated in series with countercurrent flow of steam. Thus all the steam and stripped solvent pass overhead from the first stripper.

Normally the entire stream is condensed, cooled to about 120° F., and phase separated in a decanter. The water is recycled to the first stripper to recover dissolved solvent, while the solvent phase is pumped to the wet solvent storage tank and then to a column for drying and heavies removal. About 80% of the steam heat to the reboiler of this column is required to vaporize and fractionate the side-draw for heavies removal. In this invention the vapor from the first stripper is partially cooled to a few degrees Fahrenheit above the temperature at which the solvent first condenses. Part of the water is condensed in this step. The mixture of vapor and water are fed to the bottom of a scrubbing tower containing about 14 contact trays. Recycle water at about 100° F. from the decanter and the dewatering equipment downstream of the steam strippers is injected into the top of the scrubbing tower to condense about 10% of the solvent vapor coming up the tower. The liquid hydrocarbon reflux scrubs out heavies as it descends the column over the contact trays. Considerable water is also present in the descending liquid as a separate phase but does not enter into the fractionation.

Hydrocarbon containing dissolved heavies and water liquid from the bottom of the column are pumped to the first stripper for recovery of solvent. The vapor overhead from the column is combined with wet solvent vapor from the solvent drying fractionator. The combined vapors are condensed and then phase separated in the decanter.

In one preferred embodiment, vapors from a steam stripping of the polymer solution are utilized to furnish stripping vapor for a heavies removal column.

The solvents processed in the invention are those whose properties permit their vaporization and condensation as required for the operation of the process. Useful solvents include aliphatic, cycloaliphatic, and aromatic organic compounds and other substances which are liquids and which are compatible with the polymers being produced. Preferred solvents include cyclohexane, cyclopentane, methylcyclopentane, n-hexane, benzene and toluene.

The polymers treated in the process of the invention encompass those having requisite miscibility with the solvents discussed above. Rubber polymers are preferred. Typically, the polymers are produced by solution polymerization and are derived from one or more unsaturated monomers. Useful monomers include dienes and monoethylenically unsaturated monomers. Preferred monomers are conjugated dienes containing 4–8 carbon atoms. These dienes are polymerized alone or in combination with other unsaturated monomers. Examples of useful monomers include 1,3-butadiene, isoprene, 2,3-dimethyl butadiene, 2-methoxybutadiene, 1,3-octadiene, styrene, alpha-methyl styrene, p-methyl styrene, acrylonitrile, methyl acrylate, vinyl acetate, vinyl cyclohexene, vinyl chloride, methyl vinyl ether, ethylene, propylene, 1-butene, 1-octene, and the like.

The polymers are preferably produced using one or more polymerization assistants, e.g., initiators. Suitable initiator systems for the polymerization are enumerated in U.S. Pat. No. 3,590,026, the disclosure of which is incorporated herein by reference.

The operating conditions for the process of the invention will depend upon the solvent used as well as upon other factors. Suitable conditions for the operation of the primary stripper and the heavies removal column are set out in the table which follows.

|  | Temperature | | Pressure | | | |
| --- | --- | --- | --- | --- | --- | --- |
|  | °F. | °C. | psia | | kPa | |
| Primary Stripper | 120–250 | 49–121 | 15 | 30 | 103 | 207 |
| Heavies Removal Column, Top | 110–220 | 43–104 | 13 | 25 | 90 | 172 |
| Decanter, Top. | 50–120 | 10–49 | 12 | 18 | 83 | 124 |

DRAWING

A preferred embodiment can be described by reference to the accompanying figure.

Rubber solution 11, about 25 wt. % polymer, is fed to primary steam stripper 12 wherein the polymer is precipitated in hot water and a major fraction of the solvent is steam stripped. Solvent-steam vapor passes via 1, partial condenser 13, and 2 into the lower section of heavies removal column 14. Column bottom product, mostly water but containing some solvent plus recovered heavies are returned to the primary steam stripper via 3 and pump 10.

Heavies are by definition materials less volatile than solvent but are generally high boiling impurities, entrained polymer or low molecular weight polymers whch may be steam stripped to a very minor extent. Column overhead vapor 4, containing most of the solvent in feed stream 2 plus some steam is condensed in 15 and passes to decanter 16. Water wet solvent vapor 8 from other plant sources such as the overhead of a solvent drying column may be condensed in 15 also. Water wet solvent is recovered via 17 and the water phase 7 is refluxed via pump 18 and line 5 to the heavies removal column. Additional water as required to condense solvent may be introduced via 6 and cooler 19. This water may come from the polymer recovery and finishing area via line 20 with any excess passing to the primary steam stripper for slurrying the precipitated rubber. Stripping steam, preferably from a second stage stripper not shown, is introduced into the primary stripper via 21. The decanter is equipped with a small solvent recovery packed section and refrigerated condenser 23 to recover solvent which might otherwise be lost to vent 24.

EXAMPLE

In a 6,000 lb/hr solution rubber production line which is making a 75/25 butadiene/styrene rubber in cyclohexane solvent, reactor effluent is flash concentrated to 25 wt.% polymer and fed to the primary steam stripper operating at 21 psig (145 kPa) and 210° F. (99° C.). Stripper overhead vapor is partially condensed at 175° F. and fed into the lower section of the heavies removal column equipped with 14 sieve trays operating at 18 psig (124 kPa) and 168° F. (76° C.) top temperature. Overhead vapor, 18,000 lb/hr solvent and 1748 lb/hr steam, is combined with wet solvent vapor from a solvent drying column, 4600 lb/hr solvent and 5 lb/hr steam, condensed at 100° F. (38° C.) and passed to a decanter from which wet solvent is yielded for further processing in a drying column and 1748 lb/hr of water is recovered. This water plus 11,358 lb/hr of water from the polymer finishing area are combined and fed to the top of the heavies removal column. Column bottoms, consisting of 1800 lb/hr solvent, 17,468 lb/hr water and 3 lb/hr heavies, is returned to the primary steam stripper.

I claim:

1. A process for lowering the energy requirement for a polymer recovery and solvent purification operation which comprises the steps of:
   (a) introducing a polymer reaction product comprising polymer, solvent, and material less volatile than said solvent into a stripping column;
   (b) introducing steam into said stripping column thereby producing a stripped overhead comprising steam, vaporized solvent and material less volatile than said solvent;
   (c) passing said steam stripped overhead as the heat supply into a fractionating column supplied with water reflux;
   (d) recovering wet solvent vapor as fractionated overhead from said fractionation column;
   (e) returning a stream comprising water, solvent, and materials less volatile than said solvent from the fractionation column base as reflux into said stripping column; and
   (f) recovering steam stripped polymer slurry from the base of said stripping column.

2. The process of claim 1 additionally comprising the steps of:
   (g) combining the fractionated overhead from said fractionation column with wet solvent from solvent drying operations;
   (h) condensing the combined product of (d);
   (i) passing the condensate to a decanter; and
   (j) recycling the water separated in (f) through the fractionation as water reflux of step (c).

3. Process of claim 2 wherein the water of step (i) is combined with water from a polymer recovery operation before it passes to step (j).

4. A process of claim 1, 2, or 3 wherein said polymer is a rubber polymer produced by solution polymerization and the solvent is chosen from among the group consisting of aliphatic, cyclo-aliphatic and aromatic organic compounds which are liquids and which are compatible with the polymers produced.

5. A process of claim 4 wherein said polymers are derived from conjugated dienes containing 4–8 carbon atoms polymerized alone or in combination with other unsaturated monomers chosen from among the group consisting of styrene, alpha-methyl styrene, p-methyl styrene, acrylonitrile, methylcrylate, vinyl acetate, vinyl cyclohexene, vinyl chloride, methyl vinyl ether, ethylene, propylene, 1-butene, and 1-octene.

* * * * *